United States Patent
Taft et al.

(10) Patent No.: US 7,362,703 B1
(45) Date of Patent: Apr. 22, 2008

(54) METHOD FOR DEFLECTION ROUTING OF DATA PACKETS TO ALLEVIATE LINK OVERLOAD IN IP NETWORKS

(75) Inventors: Nina Taft, San Francisco, CA (US); Supratik Bhattacharyya, San Francisco, CA (US); Christophe Diot, Villefranche sur mer (FR); Sundar Iyer, Palo Alto, CA (US)

(73) Assignee: Sprint Communications Company L.P., Ooverland Park, KS (US)

( * ) Notice: Subject to any disclaimer, the term of this patent is extended or adjusted under 35 U.S.C. 154(b) by 990 days.

(21) Appl. No.: 10/616,793

(22) Filed: Jul. 10, 2003

(51) Int. Cl.
*H04L 12/26* (2006.01)
*G06F 15/173* (2006.01)

(52) U.S. Cl. .................... 370/230; 370/238; 709/241
(58) Field of Classification Search ..... 370/230–238.1; 709/238–242
See application file for complete search history.

(56) References Cited

U.S. PATENT DOCUMENTS 5,093,824 A * 3/1992 Coan et al. ................. 370/228
5,933,425 A * 8/1999 Iwata .......................... 370/351
6,154,444 A * 11/2000 Masuo et al. ............... 370/225
6,363,319 B1 * 3/2002 Hsu ............................ 701/202

* cited by examiner

*Primary Examiner*—Chi Pham
*Assistant Examiner*—Tri H. Phan

(57) ABSTRACT

The present invention provides methods for deflecting the routing data packets in an IP network to avoid overloaded links and to alleviate link congestion. One method in accordance with the present invention is, when the next link on the shortest route path is congested, to deflect a data packet to an adjacent node with a decreasing cost to the destination that is not the next hop on the shortest route path to the destination. A further method in accordance with the present invention deflects a data packet to an intra-PoP node with a small increase in cost to the destination to avoid a congested link. These and other methods in accordance with the present invention may be used alone or in combination as a method for deflection routing data packets to alleviate and avoid link congestion in an IP network.

18 Claims, 7 Drawing Sheets

METHOD FOR DEFLECTION ROUTING OF DATA PACKETS TO ALLEVIATE LINK OVERLOAD IN IP NETWORKS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to Internet protocol networks. More particularly, the present invention relates to the routing of data packets in an Internet protocol network to alleviate link overload by directing data packets around congested links.

BACKGROUND OF THE INVENTION

Internet protocol networks, often referred to as IP networks, are used to transmit data throughout the United States and around the world. IP networks may transmit packets of data for Internet use, but also may carry any other type of data in IP format, such as voice telecommunications using voice-over-IP protocols.

IP networks may comprise very high bandwidth transport media, such as optical fibers, that serve as links to connect points of presence, often referred to as PoPs. Within a PoP, one or more routers receive and direct packets over the links. A link has two ends, each of which terminates with a router in a PoP. Each link connects a pair of routers and transmits data packets between those two routers. Some links are inter-PoP links that connect routers in different PoPs. Other links are intra-PoP links that connect routers within the same PoP.

A router may be thought of as being "adjacent" to another router if they are separated by only one link. Adjacent routers may be in different PoPs, or may be in the same PoP. A router may receive a data packet over a link from the adjacent router connected to it by that link. Each router independently determines how to route a packet. Routing decisions may be made based upon weights assigned to the links by the network operator. Using methods and protocols well-known in the art, the receiving router will then determine how to forward the received data packet over a link to another router. A data packet bound for a destination node in an IP network accordingly "hops" along the links of an IP network from router to router until it reaches its destination.

While IP networks perform well under most circumstances, link overload is a problem that can impair the function of IP networks and, in turn, interfere with the practices of those using an IP network to carry data. Experience with existing IP networks indicates that the incidence of link overload in an IP network is often very low. However, experience with existing IP networks further indicates that at least a few links in an IP network are likely to be overloaded at any given time, as the number of links in an IP network is so large that even a very low incidence of link overload implies that at any given time a few links in an IP network are likely to be overloaded. Link overload may occur for a variety of reasons, such as the failure of an adjacent link due to physical damage, unexpected fluctuations in network traffic, denial of service attacks, or other causes. When a link becomes congested, it would be desirable to route data packets around the congested link, even if the route used to deflect the packet around the congested link is longer than the route through the congested link. Such a routing method would prevent the data packet from being slowed by the congested link and would allow the congestion on the overloaded link to dissipate, thereby improving network performance.

BRIEF SUMMARY OF THE INVENTION

The present invention deflects the routing of data packets in an IP network to avoid an overloaded link. In accordance with the present invention, if a data packet intended for a destination node in the IP network is received at a receiving node and the next link of the shortest route path for that data packet is congested, the receiving router determines whether an adjacent node may receive the data packet without creating routing loops and without significantly increasing the cost to the destination node. Generally, a data packet may be deflected to avoid link overload if it may be routed to an adjacent PoP that has a decreased cost to the destination compared to the receiving PoP, and may be deflected within the receiving PoP if the node within the PoP to which it is deflected increases the cost to the destination by no more than a predetermined maximum weight of an intra-PoP link, the predetermined weight for an intra-PoP link being much less than the minimum weight of an inter-PoP link.

BRIEF DESCRIPTION OF THE SEVERAL VIEWS OF THE DRAWING

The present invention is described in detail below with reference to attached figures, wherein.

DETAILED DESCRIPTION OF THE INVENTION

Figure 1:
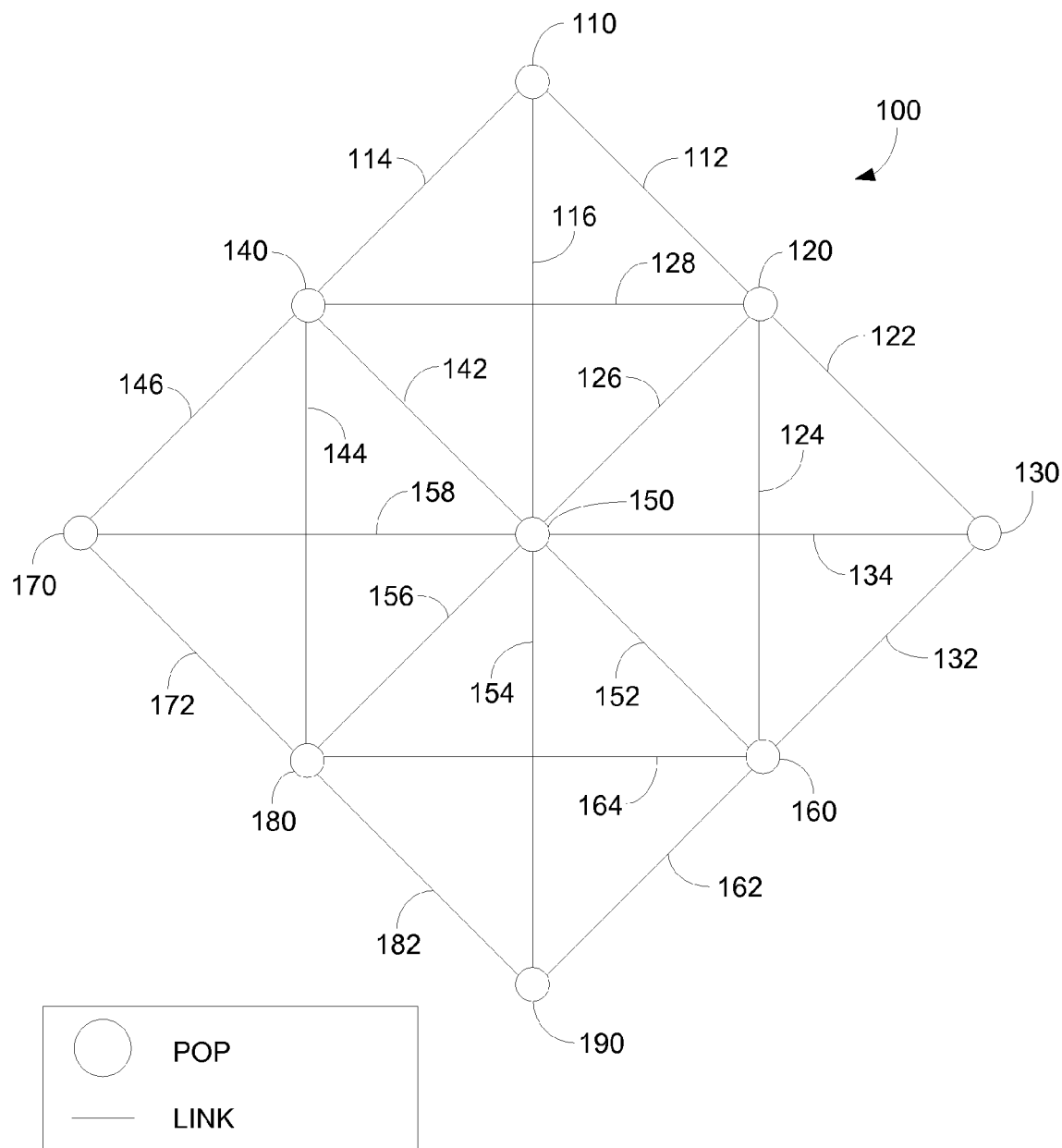
FIG. 1 illustrates a portion of an IP network with which the present invention may be practiced.

Referring now to FIG. 1, a portion 100 of an IP network with which the present invention may be practiced is illustrated at a high level. Portion 100 includes a plurality of points of presence, or PoPs, including a first PoP 110, a second PoP 120, a third PoP 130, a fourth PoP 140, a fifth PoP 150, a sixth PoP 160, a seventh PoP 170, an eighth PoP 180, and a ninth PoP 190. A plurality of links connect the PoPs. The first PoP 110 connects to the second PoP 120 via link 112, connects to the fifth PoP 150 via link 116, and connects to the fourth PoP 140 via link 114. The second PoP 120 further connects to the fourth PoP 140 via link 128, connects to the fifth PoP 150 via link 126, and connects to the third PoP 130 via link 122. The third PoP 130 further connects to the fifth PoP 150 via link 134 and connects to the sixth PoP 160 via link 132. The fourth PoP 140 further connects to the fifth PoP 150 via link 142, connects to the eighth PoP 180 via link 144, and connects to the seventh PoP 170 via link 146. The fifth PoP 150 further connects to the seventh PoP 170 via link 158, connects to the eighth PoP 180 via link 156, and connects to the ninth PoP 190 via link 154. The sixth PoP 160 further connects to the eighth PoP 180 via link 164 and connects to the ninth PoP 190 via link 162. The seventh PoP 170 further connects to the eighth PoP 180 via link 172. The eighth PoP 180 further connects to the ninth PoP 190 via link 182. It should be noted that a link connecting a pair of PoPs may simultaneously carry traffic in both directions.

As illustrated in FIG. 1, a data packet received in a PoP, such as the first PoP 110, intended for a destination in another PoP, such as the eighth PoP 180, may be routed from receiving PoP 110 to destination PoP 180 along a variety of routes. For example, the data packet may be routed from PoP 110 to PoP 140 via link 114, and from there may be routed from PoP 140 to PoP 180 via link 144. Alternatively, the data packet may be routed from PoP 110 via link 116 to PoP 150, and from there may be routed via link 156 to the destination PoP 180. Other routes involving additional links may also be used. For example, the data packet may be routed from PoP 110 via link 112 to PoP 120, from there may be routed via link 124 to PoP 160, and from there may be routed via link 164 to destination PoP 180.

A router receiving a data packet may determine what is referred to as the "shortest route path" to the data packet's destination. To determine the shortest route path, the receiving router considers the weight assigned by the IP network operator to each link in the network. The shortest route path is the route for which the sum of the weight of the links is the least, which is not necessarily the shortest physical route for the data packet. In an IP network, information regarding the network, such as the identity of other routers in the network, the links in the network, and the weights assigned to those links may be stored electronically on each router in the network. In this way, each router may independently determine the shortest route path for a received data packet, rather than having to access such information from an external or centralized source, which would further consume network resources and delay transmission. This process often functions well, but when a link is overloaded it does not provide a method for routing a data packet around a congested link when that link is the next link on the shortest route path determined by the receiving router.

Figure 2:
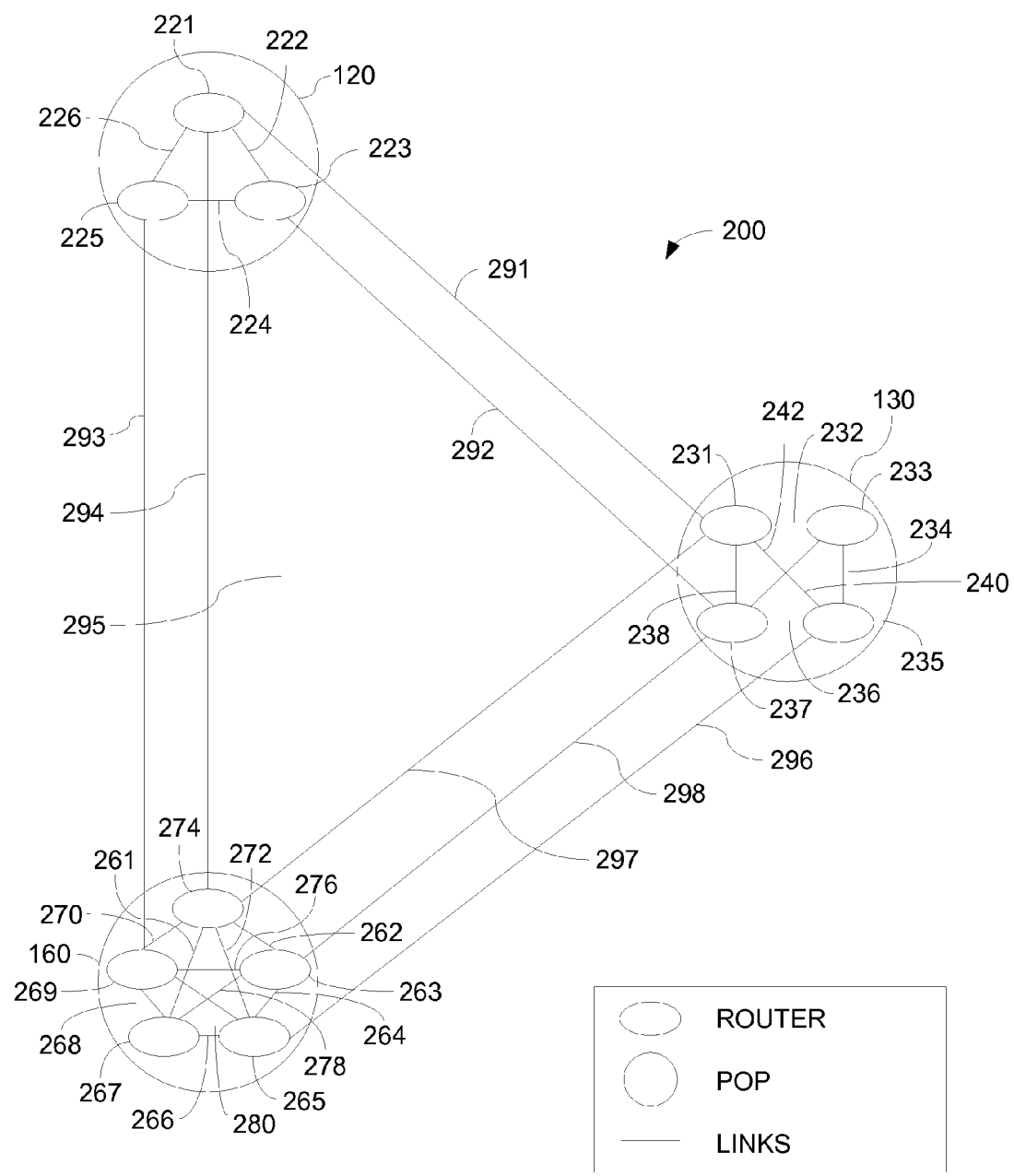
FIG. 2 illustrates a smaller portion of an IP network with which the present invention may be practiced.

Referring now to FIG. 2, a smaller portion 200 of the portion 100 of the IP network is illustrated in a greater detail. Portion 200 includes three PoPs illustrated in FIG. 1, namely the second PoP 120, the third PoP 130, and the sixth PoP 160. In actuality, what was represented at a high level as a single link connecting a pair of PoPs in FIG. 1 will often in practice be multiple links connecting different routers within a pair of PoPs. For example, the second PoP 120 may contain a first router 221, a second router 223, and a third router 225. The third PoP 130 may include a first router 231, a second router 233, a third router 235, and a fourth router 237. Link 122 represented in FIG. 1 as a single link may in actuality be a first inter-PoP link 291 connecting first router 221 in the second PoP 120 to first router 231 in the third PoP 130 and a second inter-PoP link 292 connecting second router 223 in the second PoP 120 to fourth router 237 in the third PoP 130.

The sixth PoP may contain a first router 261, a second router 263, a third router 265, a fourth router 267, and a fifth router 269. What was represented in FIG. 1 at a high level as a single inter-PoP link 124 may in practice be multiple inter-PoP links including inter-PoP link 293 connecting third router 225 in the second Pop 120 to fifth router 269 in the sixth PoP 160, inter-PoP link 294 connecting first router 221 in the second PoP 120 to first router 261 in the sixth PoP 160, and inter-PoP link 295 connecting second router 223 in the second PoP 120 to second router 263 in the sixth PoP 160.

Likewise, what was represented in a high level in FIG. 1 as a single inter-PoP link 132 may in practice be multiple inter-PoP links, including inter-PoP link 296 connecting third router 235 in the third PoP 130 to third router 265 in the sixth PoP 160, inter-PoP link 297 connecting fourth router 237 in the third PoP 130 to second router 263 in the sixth PoP 160, and inter-PoP link 298 connecting first router 231 in the third PoP 130 to router 261 in the sixth PoP.

Intra-PoP links may connect routers within a PoP. For example, within the second PoP intra-PoP link 222 connects first router 221 to second router 223, intra-PoP link 224 connects second router 223 to third router 225, and intra-PoP link 226 connects first router 221 to third router 225. Within the third PoP 130, intra-PoP link 232 connects first router 231 to second router 233, intra-PoP link 234 connects second router 233 to third router 235, intra-PoP link 236 connects third router 235 to fourth router 237, intra-PoP link 238 connects fourth router 237 to first router 231, intra-PoP link 240 connects first router 231 to third router 235, and intra-PoP link 242 connects second router 233 to fourth router 237. Within the sixth PoP 160, intra-PoP link 262 connects first router 261 to second router 263, intra-PoP link 264 connects second router 263 to third router 265, intra-PoP link 266 connects third router 265 to fourth router 267, intra-PoP link 268 connects fourth router 267 to fifth router 269, intra-PoP link 270 connects fifth router 269 to first router 261, intra-PoP link 274 connects first router 261 to fourth router 267, intra-PoP link 272 connects first router 261 to third router 265, intra-PoP link 276 connects second router 263 to fifth router 269, intra-PoP link 278 connects second router 263 to fourth router 267, and intra-PoP link 280 connects third router 265 to fifth router 269. It should be noted that any number of routers may be included within a single PoP. It should be further noted that the configuration of routers and links illustrated in FIG. 2 are exemplary only, and that actual numbers and configurations in an actual IP network with which the present invention is used may vary.

Figure 3:
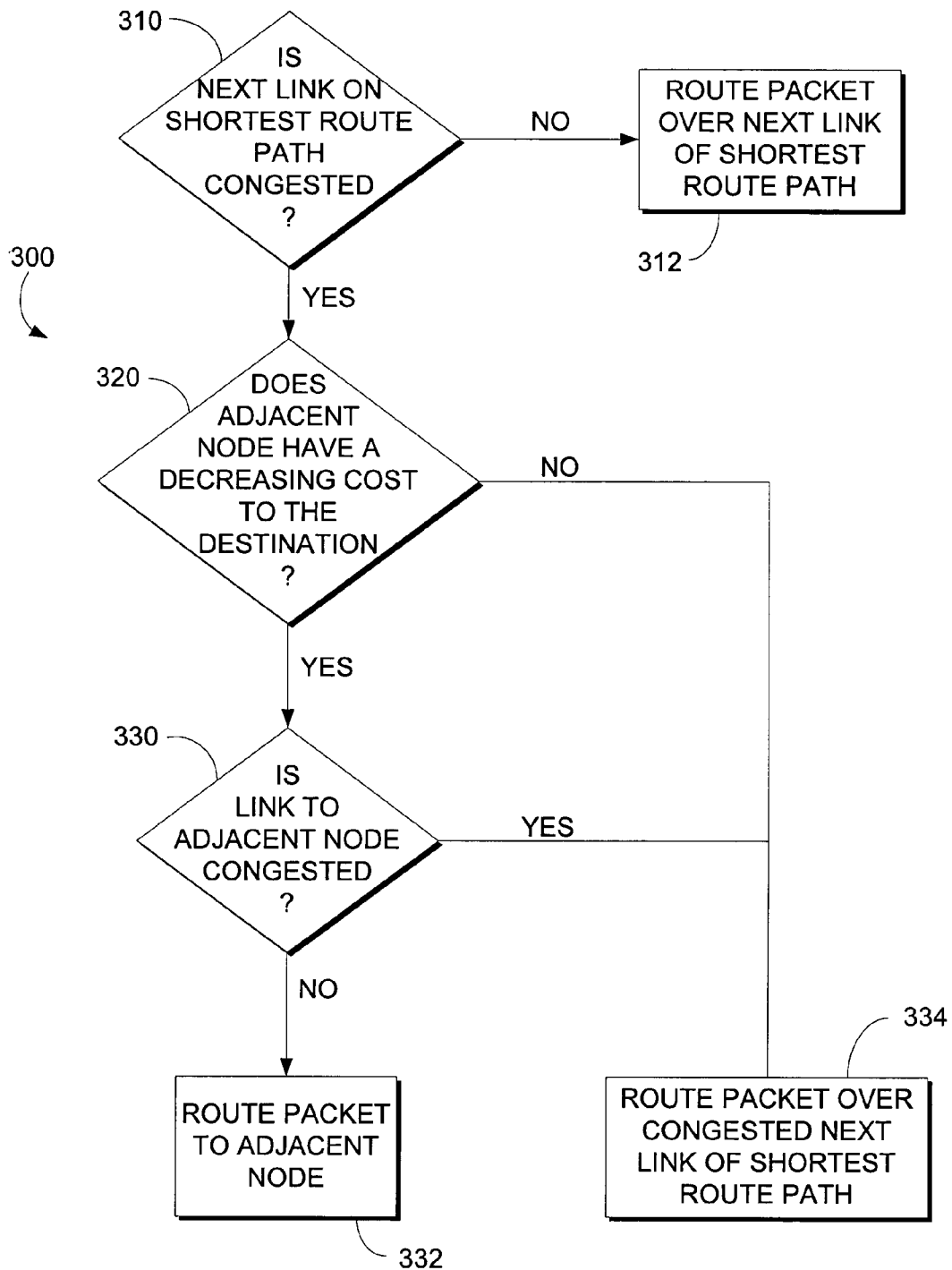
FIG. 3 illustrates a method in accordance with the present invention for deflecting the routing of packets to avoid link overload.

Referring now to FIG. 3, a method 300 in accordance with the present invention for deflecting the routing of a data packet to avoid link overload is illustrated. Method 300, as well as other methods in accordance with the present invention, may be implemented. For example, when a packet is received at PoP 130 as illustrated in FIG. 1. If the data packet is, for example, to be routed to destination PoP 170, the next link of the shortest route path from PoP 130 to PoP 170 may be link 134. The cost of the shortest route path may be designated C. If link 134 is congested, method 300 may deflect the data packet to PoP 120 via link 122 if the cost from PoP 120 to PoP 170 is less than C, even though the combined cost of the shortest route path from PoP 120 and link 122 is greater than C.

In step 310 of method 300 it is determined whether the next link on the shortest route path to the destination from the receiving node is congested. If the next link on the shortest route path is not congested, the data packet may be routed over the next link on the shortest route path in step 312, in accordance with normal procedures. However, if the next link on the shortest route path is congested, step 320 determines whether there exists an adjacent node having a lower cost to the destination, even if the total cost of the destination via the adjacent node exceeds the cost of the shortest route path from the receiving node. This requirement may be conceived as a lower cost requirement, which avoids routing loops by requiring that the cost to the ultimate destination lower with every transmission of the packet, although the next step may not always be the next link on shortest route to the destination. If there is no adjacent node with a lower cost of the destination, then the data packet may be routed over the congested link of the shortest route path in step 334. If, however, there is an adjacent node with a lower cost of the destination, step 330 determines whether the link to the adjacent node is congested. If both the link to the adjacent node and the next link in the shortest route path are congested, then method 300 may proceed to route the packet over the congested next link of the shortest route path in step 334. Alternatively, method 300 may repeat any number of desired times. If, as is often the case in an actual IP network, the link to the identified adjacent node is not congested the packet may be routed to the identified adjacent node in step 332.

Steps 310 and 330 of method 300 of determining whether a given link is congested, and similar steps of determining whether a link is congested in other methods in accordance with the present invention, may be performed by the receiving router using information available to the router. Because each link connects two, and only two routers, all data packets transmitted over a link either originate or terminate with the receiving router. Accordingly, the receiving router may determine whether a given link is congested. Congestion, or link overload, may be defined in a variety of ways. Congestion may be thought of as link utilization beyond a threshold level set as acceptable by a network operator. One threshold sometimes set in present IP networks is the threshold of one-half link capacity. In such an example, a link is considered overloaded if over one-half of its capacity is being utilized. One reason for selecting one-half as the threshold is to provide sufficient bandwidth available for the link to allow it to completely compensate for the failure of a neighboring link of the same capacity. However, any other threshold may be set as a definition for congestion.

It should further be appreciated, with regard to FIG. 3, that the steps of method 300 may occur simultaneously. In particular, because the receiving router possesses information regarding the utilization rates of all links connected to it, as well as information regarding the weights of all links in the IP network, step 310, step 320, and step 330 may occur simultaneously.

Method 300 shown in FIG. 3 generally serves to deflect the routing of a data packet from a receiving node to a node in a different PoP. While method 300 may successfully deflect a data packet around a congested link for almost every hop on its trip to its destination, it will not allow a data packet to be deflected from its "last hop." The last hop may, for example, over a link that directly connects the receiving router to the destination node with a cost C when no node adjacent to the receiving node has a cost to the destination node less than C. For example, in reference to FIG. 2, the first router 221 in the second PoP 120 may receive a data packet destined for the first router 231 in the third PoP 130. If link 291 is congested and is the shortest route path having a weight of C, no node adjacent to the first router 221 may have a cost less than C. In this example, method 300 will route the data packet over congested link 291. Routing the data packet over a congested link in accordance with method 300 may be acceptable if method 300 has deflected the routing of sufficient other data packets to alleviate the overload of the congested link 291. However, it may be desirable to further alleviate the overload of a congested link by deflecting packets for which the congested link is the last hop to the packet's destination. Additional methods in accordance with the present invention that overcome the problem of the last hop link being congested by deflecting a data packet within the receiving PoP are described below. The following methods may be useful for deflecting the routing of a data packet to deal with problems of congestion arising from other scenarios as well.

Figure 4A:
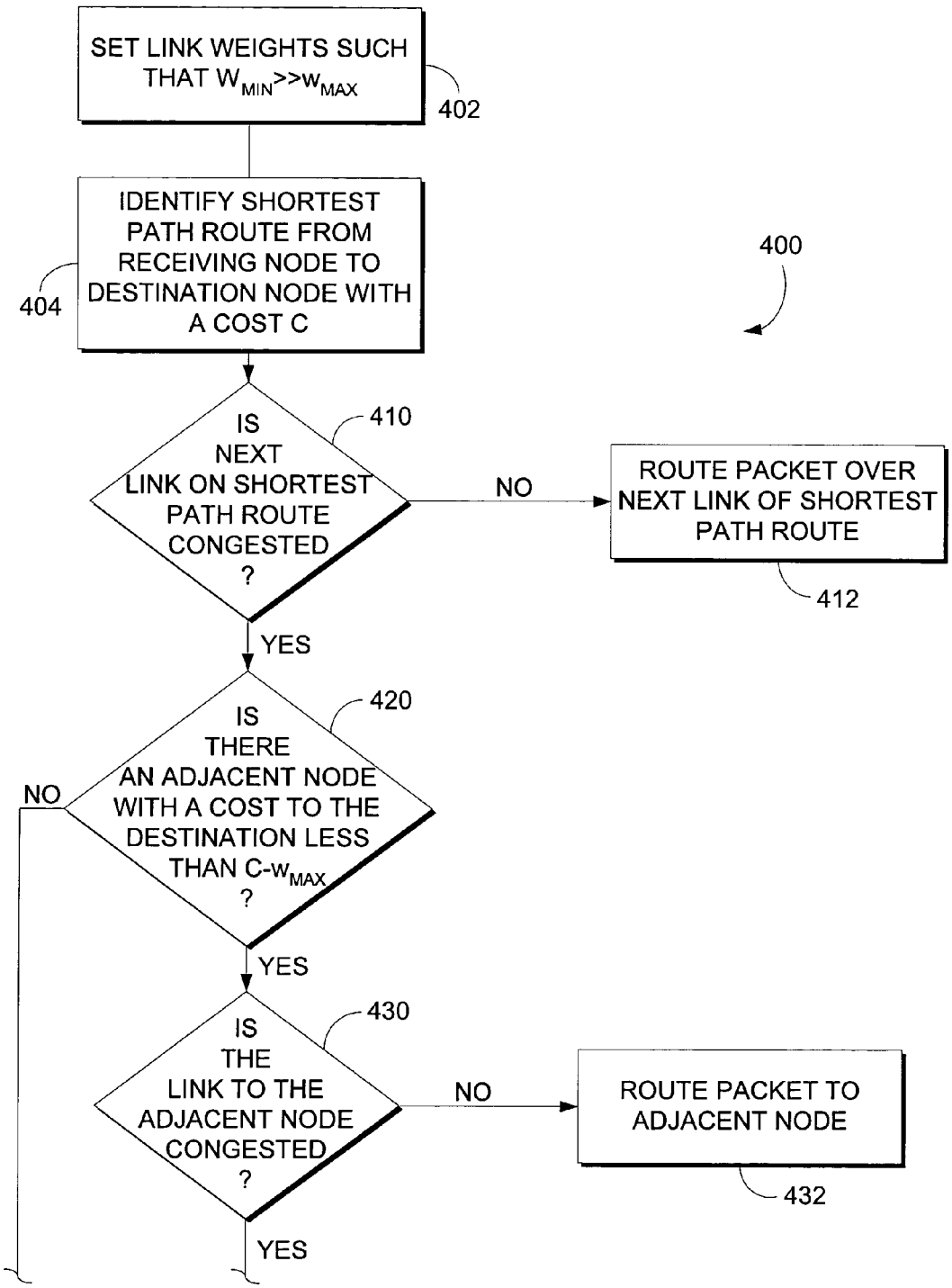
FIGS. 4A and 4B illustrate a method in accordance with the present invention of deflecting the routing of data packets to avoid link overload.
Figure 4B:
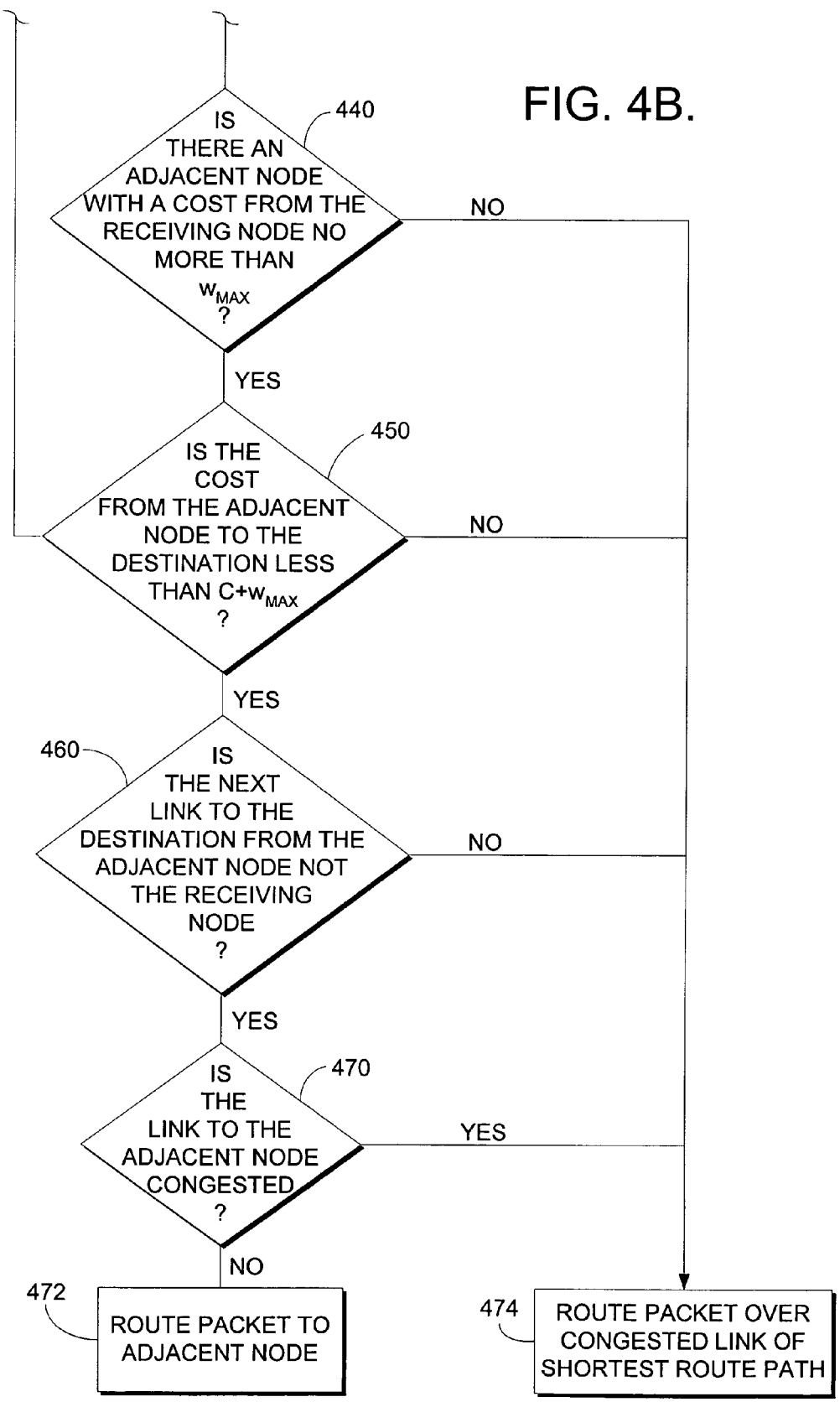

Referring now to FIG. 4, a further method 400 in accordance with the present invention for deflecting the routing of a data packet to avoid link overload is illustrated. Link weights in the IP network may be set in step 402 such that $W_{min}$, which represents the minimum inter-PoP link weight, is much greater than $w_{max}$, which represents the maximum intra-PoP link weight. For example, $W_{min}$ may be approximately five to ten times greater than $w_{max}$, although this range may vary greatly in different IP networks. In step 404, the receiving router identifies the shortest route path from the receiving node to the destination node, the cost of the shortest route path being designated C. In step 410, the receiving router determines whether the next link on the shortest route path is congested. If the next link on the shortest route path is not congested, the data packet is routed over the next link of the shortest route path in step 412. If the next link on the shortest route path is congested, however, then the data packet will be deflected around the congested link if possible. In step 420, the receiving router determines whether there is an adjacent node with a cost to the destination less than $C-w_{max}$. If no such nodes are identified in step 420, method 400 proceeds to step 440. If an adjacent node is identified in step 420, method 400 proceeds to step 430 to determine whether the link to the identified adjacent node with a cost to the destination less than $C-w_{max}$ is congested. If the link is not congested, the data packet is routed to that adjacent node in step 432. If the link to the adjacent node with a cost to the destination less than $C-w_{max}$ is congested, or if there is no identified adjacent node with a cost to the destination less than $C-w_{max}$, then method 400 proceeds with step 440 to determine whether there is an adjacent node with a cost from the receiving node no more than $w_{max}$. In step 450, it is determined whether an adjacent node with a cost of no more than $w_{max}$ from the receiving node has a cost from that adjacent node to the destination less than $C+w_{max}$. It should be noted that step 450 allows a small increase in the total cost of the destination, but also allows a data packet to be routed to a different router within a PoP to avoid a congested link. For example, in reference to FIG. 2, a data packet received by router 221 intended to ultimately reach destination router 231 may be deflected to avoid congestion on link 291. Router 223 will be identified in step 440 as a node with a cost from the receiving node of less than $w_{max}$, as link 222 is an intra-PoP link that cannot have a weight greater than $w_{max}$. The cost from router 223 to destination router 231 is the sum of the link weights of inter-PoP link 292 and intra-PoP link 238. If, as is often the case in an IP network, inter-PoP links connecting the same pair of PoPs have the same weight, the sum of the weights of inter-PoP link 292 (C) and intra-PoP link 222 (no greater than $w_{max}$) is no greater than $C+w_{max}$. In step 460, it is determined whether the link to the destination from the adjacent node is not the receiving node itself. Step 460 prevents looping directly between two routers within the PoP. In step 470 it is determined whether the link to the identified intra-PoP adjacent node is congested. If the link to the identified intra-PoP adjacent node is not congested then the packet is routed to that adjacent node in step 472. If the response to step 440 is negative, if the response to step 450 is negative, if the response to step 460 is negative, or if the response to step 470 is positive, then method 400 proceeds to route the packet over the congested link of the shortest route path in step 474, as no alternative routing has been identified by method 400. It should be noted that step 440, step 450, and step 460 may be implemented independent of the other steps of method 400.

Figure 5A:
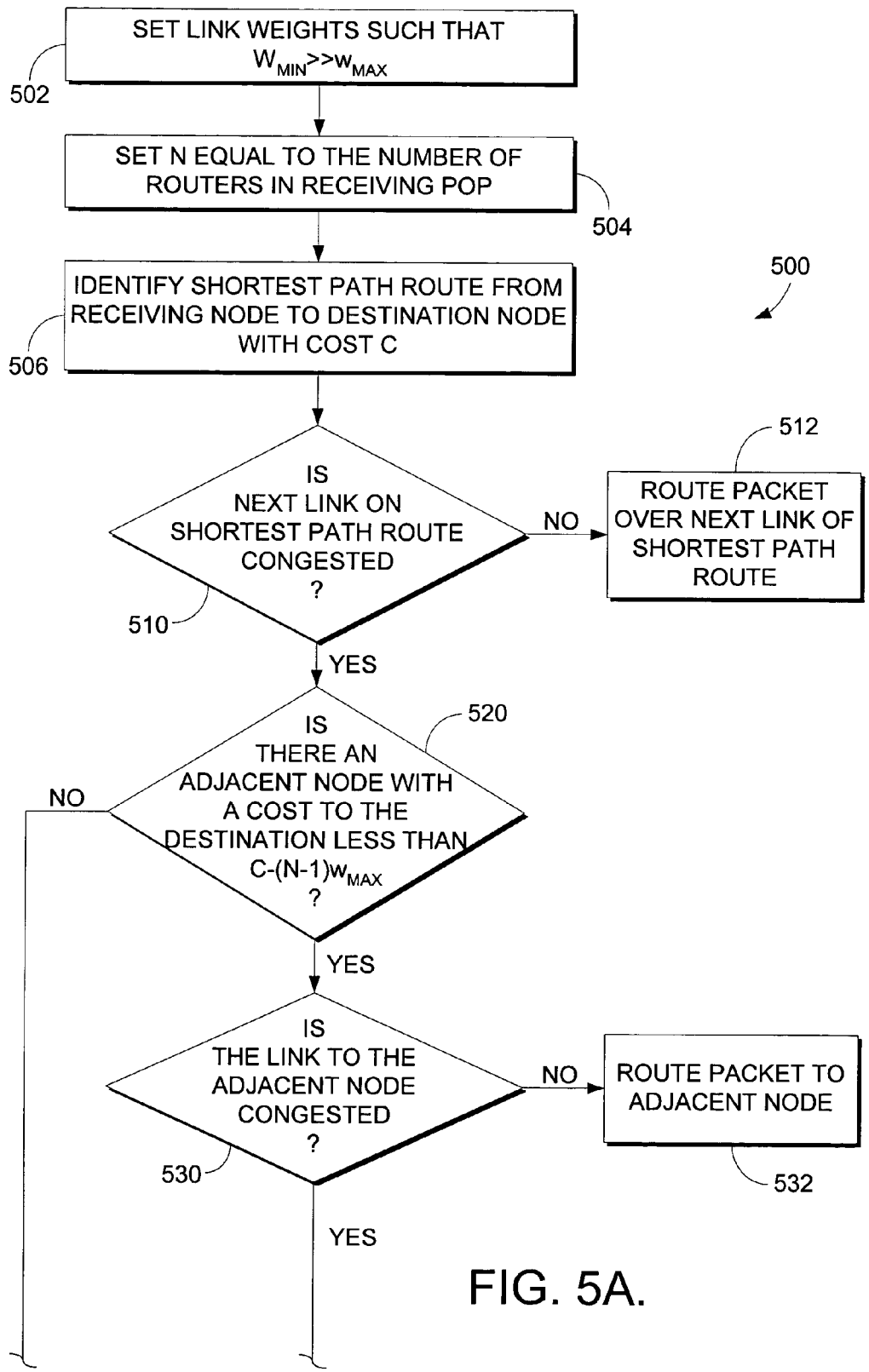
FIGS. 5A and 5B illustrate a method in accordance with the present invention to deflect the routing of packets to avoid link overload.
Figure 5B:
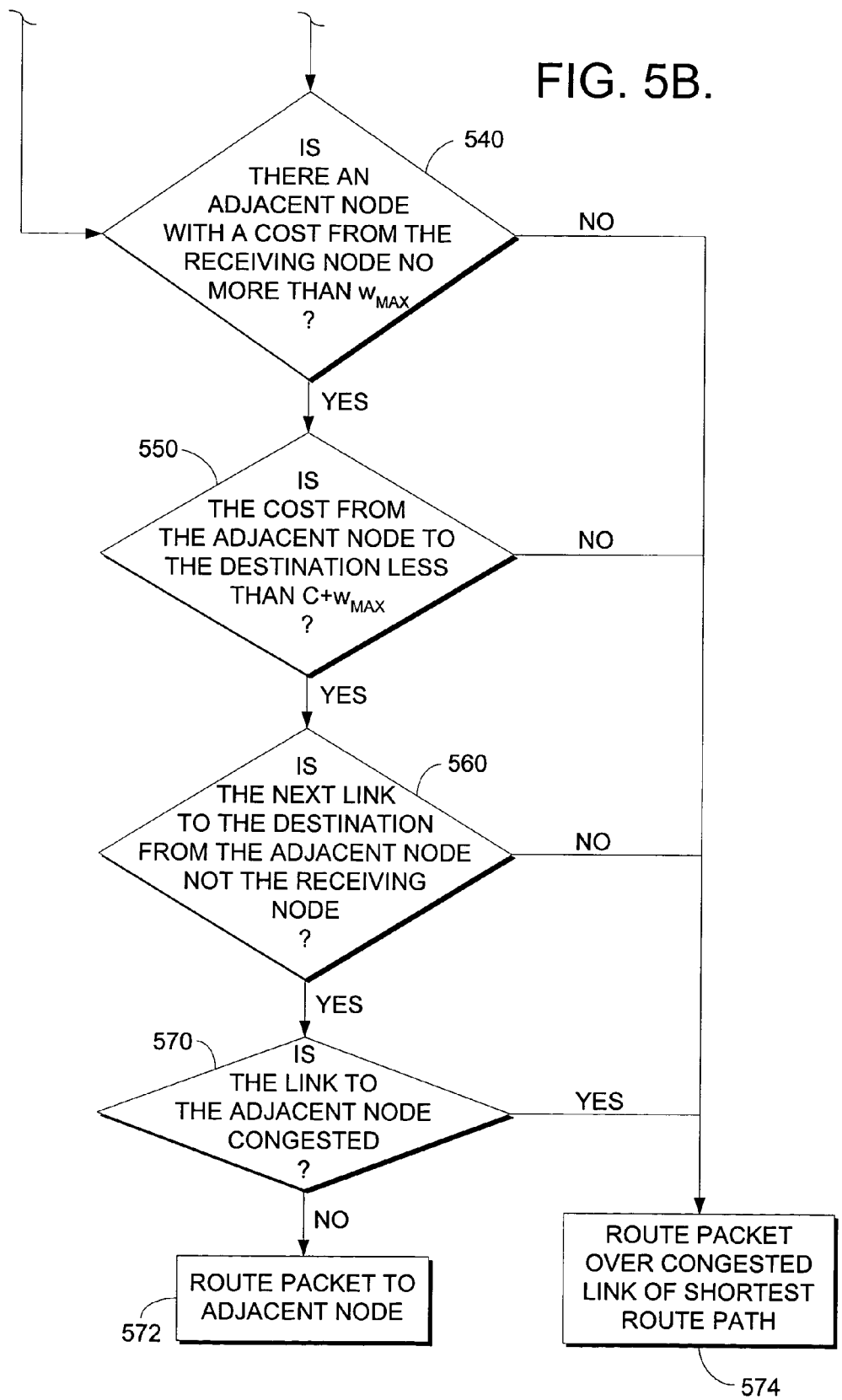

Referring now to FIG. 5, a further method 500 in accordance with the present invention for deflecting the routing of a data packet to avoid link overload is illustrated. Method 500 is an adaptation of method 400 to handle one or more link failures in the network. In the worst case, in a PoP with n routers there may be two routers with a cost of $(n-1)w_{max}$ between them, meaning that if a packet is deflected multiple times within a PoP the cost to the destination may increase by $(n-1)w_{max}$.

In step 502 the link weights are set such that $W_{min}$, which represents the minimum inter-PoP link weight, is much greater than $w_{max}$, and is greater than $(n-1)w_{max}$. As noted with regard to method 400, $W_{min}$ may be approximately five to ten times greater than $w_{max}$, although this difference may vary. In step 504 a number n is determined, n equaling the number of routers in the receiving PoP. The value set for n in step 504 will be the same for every router within a PoP, but may vary between PoPs. In step 506 the shortest route path from the receiving node to the destination node with a cost C is identified. In step 510 it is determined whether the next link on the shortest route path from the receiving node to the destination is congested. If not, in step 512 the data packet is routed over the next link of the shortest route path. If the result of step 510 is to conclude that the next link on the shortest route path is congested, method 500 proceeds to step 520. In step 520 it is determined whether there is an adjacent node with a cost to the destination less than $C-(n-1)w_{max}$. If no adjacent node is identified in step 520 method 500 also proceeds to step 540. If an adjacent a node is identified in step 520 method proceeds to step 530. In step 530 it is determined whether the link to the inter-PoP adjacent node identified in step 520 is congested. If the link is not congested, method 500 proceeds to step 532 and the data packet is routed to the inter-PoP adjacent node identified in step 520. If the link is congested, method 500 proceeds to step 540. In step 540 it is determined whether there is an adjacent node with a cost from the receiving node no more than $w_{max}$. If an adjacent node is identified in response to step 540, method 500 proceeds to step 550. In step 550 it is determined whether the cost from the intra-PoP adjacent node identified in step 540 to the destination is less than $C+w_{max}$. If the result of step 550 is positive, method 500 proceeds to step 560. In step 560 it is determined whether the next link to the destination from the identified intra-PoP adjacent node is not the receiving node itself. Step 560 prevents looping from occurring directly between two routers within the receiving PoP. If the result of step 560 is positive, method 500 proceeds to step 570. In step 570 it is determined whether the link to the identified intra-PoP adjacent node is congested. If the response to step 570 is negative, method 500 proceeds to the data packet to the identified intra-PoP adjacent node in step 572. If the result of step 540 is negative, if the result of step 550 is negative, if the result of step 560 is negative, or if the result of step 570 is positive, method 500 proceeds to step 574, and the data packet is routed over the congested link of the shortest route path. It should be noted that step 540, step 550, and step 560 may be implemented independent of the other steps of method 500.

One skilled in the art will appreciate that the above described methods in accordance with the present invention may be implemented using computer readable media containing computer readable code to cause routers in an IP network to perform the determination steps of the methods described above. These determination steps may be performed in any order, including simultaneously. Other steps, such as the setting of link weights, whether inter-PoP or intra-PoP, may be performed by IP network operators or through appropriate automated means. One skilled in the art will further realize that individual steps in the methods in accordance with the invention described above may be omitted, either to simplify the routing algorithm or if network topology makes a step an unnecessary precaution to avoid, for example, routing loops.

What is claimed is:

1. A method for routing a packet ultimately intended for a destination node in an IP network by a receiving node, wherein all links between nodes have an assigned weight, wherein the cost of a route is the sum of the weight of all links on that route, wherein the minimum weight of an inter-PoP link is designated $W_{min}$, wherein the maximum weight of an intra-PoP link is designated $w_{max}$, wherein $W_{min} > w_{max}$, and wherein the shortest route path between the receiving node and the destination node is the route that has the lowest possible cost designated C, the method comprising:

determining whether the next link of the shortest route path from the receiving node to the destination node is congested; and if the next link of the shortest route path from the receiving node to the destination node is congested:

identifying at least one node adjacent to the receiving node with a shortest route path between the adjacent node and the destination node not greater than $C+w_{max}$ and with a cost between the at least one adjacent node and the receiving node less than $w_{max}$; determining if the link between the receiving node and each of the at least one identified adjacent nodes is congested; and routing the packet to one of the at least one identified adjacent node if the link between the receiving node and the one of the at least one identified adjacent node is not congested.

2. The method for routing a packet of claim 1, wherein determining whether a link is congested comprises determining whether traffic on that link exceeds a pre-determined fraction of the capacity of the link.

3. The method for routing a packet of claim 2, wherein the predetermined fraction of the capacity of the link comprises one-half.

4. The method for routing a packet of claim 3 further comprising, if the next link of the shortest route path from the receiving node to the destination node is congested:

determining which of the at least one identified adjacent node with a link between the identified adjacent node and the receiving node that is not congested has the lowest cost route to the destination node; and wherein:

routing the packet to one of the at least one identified adjacent node comprises routing the packet to the adjacent node determined to have the lowest cost route to the destination node.

5. A method for deflecting the routing of a packet around congestion in an IP network, the packet to be routed by a receiving node and ultimately intended for a destination node, wherein each link connecting a pair of nodes in the IP network is assigned a weight, wherein the cost of a route is the sum of the weights of all links in that route, wherein the shortest route path between a pair of nodes is the route between that pair of nodes with the lowest possible cost, wherein the smallest weight of an inter-PoP link is $W_{min}$, wherein the largest weight of an intra-PoP link is $w_{max}$, wherein $W_{min} \gg w_{max}$, wherein the cost of the shortest route path between the receiving node and the destination node is C, and wherein the next link of the shortest route path between the receiving node and the destination node is congested, the method comprising:

identifying nodes adjacent to the receiving node connected to the receiving node by non-congested links;

determining if one of the identified adjacent nodes has a shortest route path between that adjacent node and the destination node with a cost less than $C-w_{max}$ and, if so, routing the packet to that node and, if not:

determining if one of the identified adjacent nodes:

has a cost no more than $w_{max}$, from the receiving node;

has a shortest route path between that adjacent node and the destination node with a cost no greater than $C+w_{max}$; and has a next link of the shortest route path between that adjacent node and the destination node that is not with the receiving node; and if so, routing the packet to that adjacent node.

6. The method for deflecting the routing of a packet of claim 5, wherein identifying nodes adjacent to the receiving node connected to the receiving node by noncongested links comprises determining that the link is non-congested if its traffic is below a predetermined fraction of the capacity of the link.

7. The method for deflecting the routing of a packet of claim 6, wherein the predetermined fraction of the capacity of the link is one half.

8. A method for deflecting the routing of a packet around congestion in an IP network, the IP network comprising a plurality of PoPs each with at least one router and a plurality of links connecting the routers, the packet to be routed by a receiving router and ultimately intended for a destination router, wherein each link connecting a pair of routers in the IP network is assigned a weight, wherein the cost of a route is the sum of the weights of all links in that route, wherein the shortest route path between a pair of routers is the route between that pair of routers with the lowest possible cost, wherein the smallest weight of a link connecting routers in different PoPs is $W_{min}$, wherein the largest weight of a link connecting routers in the same PoP is $w_{max}$, wherein $W_{min} \gg w_{max}$, wherein n denotes the number of routers in a PoP, wherein $W_{min} > (n-1)w_{max}$, and wherein the next link of the shortest route path between the receiving node and the destination node is congested, the method for deflecting the routing of the packet comprising:

identifying routers adjacent to the receiving router connected to the receiving router by non-congested links;

determining if one of the identified adjacent routers has a shortest route path between that adjacent router and the destination router with a cost less than $C-(n-1)w_{max}$, and, if so, routing the packet to that router and, if not:

determining if one of the identified adjacent routers:

has a cost no more than w, from the receiving router;

has a shortest route path between the receiving router and the destination router with a cost no greater than $C+w_{max}$; and has a next link of the shortest route path between that adjacent router and the destination router that is not with the receiving router; and if so, routing the packet to that adjacent router.

9. The method for deflecting the routing of a packet of claim 8, wherein identifying routers adjacent to the receiving router connected to the receiving router by noncongested links comprises determining that the link is non-congested if its traffic is below a predetermined fraction of the capacity of the link.

10. The method for deflecting the routing of a packet of claim 9, wherein the predetermined fraction of the capacity of the link is one half.

11. One or more computer readable media containing computer readable code embodied thereon for causing a router to perform a method for routing a packet ultimately intended for a destination node in an IP network, wherein all links between nodes have an assigned weight, wherein the cost of a route is the sum of the weight of all links on that route, wherein the minimum weight of an inter-PoP link is designated $W_{min}$, wherein the maximum weight of an intra-PoP link is designated $w_{max}$, wherein $W_{min} > w_{max}$, and wherein the shortest route path between the receiving node and the destination node is the route that has the lowest possible cost designated C, the method comprising:

determining whether the next link of the shortest route path from the receiving node to the destination node is congested; and if the next link of the shortest route path from the receiving node to the destination node is congested:

identifying at least one node adjacent to the receiving node with a shortest route path between the adjacent node and the destination node not greater than $C+w_{max}$ and with a cost between the at least one adjacent node and the receiving node less than $w_{max}$; determining if the link between the receiving node and each of the at least one identified adjacent nodes is congested; and routing the packet to one of the at least one identified adjacent node if the link between the receiving node and the one of the at least one identified adjacent node is not congested.

12. The computer readable media of claim 11, wherein determining whether a link is congested comprises determining whether traffic on that link exceeds a pre-determined fraction of the capacity of the link.

13. The computer readable media of claim 12, wherein the predetermined fraction of the capacity of the link comprises one-half.

14. The computer readable media of claim 13, wherein the method further comprises, if the next link of the shortest route path from the receiving node to the destination node is congested:

determining which of the at least one identified adjacent node with a link between the identified adjacent node and the receiving node that is not congested has the lowest cost route to the destination node; and wherein:

routing the packet to one of the at least one identified adjacent node comprises routing the packet to the adjacent node determined to have the lowest cost route to the destination node.

15. One or more computer readable media containing computer readable code embodied thereon for causing a router to perform a method for deflecting the routing of a packet around congestion in an IP network, the IP network comprising a plurality of PoPs each with at least one router and a plurality of links connecting the routers, the packet to be routed by a receiving router and ultimately intended for a destination router, wherein each link connecting a pair of routers in the IP network is assigned a weight, wherein the cost of a route is the sum of the weights of all links in that route, wherein the shortest route path between a pair of routers is the route between that pair of routers with the lowest possible cost, wherein the smallest weight of a link connecting routers in different PoPs is $W_{min}$, wherein the largest weight of a link connecting routers in the same PoP is $w_{max}$, wherein $W_{min} \gg w_{max}$, wherein n denotes the number of routers in a PoP, wherein $W_{min} > (n-1)w_{max}$, and wherein the next link of the shortest route path between the receiving node and the destination node is congested, the method for deflecting the routing of the packet comprising: identifying routers adjacent to the receiving router connected to the receiving router by non-congested links;

determining if one of the identified adjacent routers has a shortest route path between that adjacent router and the destination router with a cost less than $C-(n-1)w_{max}$ and, if so, routing the packet to that router and, if not:
determining if one of the identified adjacent routers:

has a cost no more than $w_{max}$ from the receiving router;

has a shortest route path between the receiving router and the destination router with a cost no greater than $C+w_{max}$; and has a next link of the shortest route path between that adjacent router and the destination router that is not with the receiving router; and if so, routing the packet to that adjacent router.

16. The computer readable media of claim 15, wherein identifying routers adjacent to the receiving router connected to the receiving router by non-congested links comprises determining that the link is non-congested if its traffic is below a predetermined fraction of the capacity of the link.

17. The computer readable media of claim 16, wherein the pre-determined fraction of the capacity of the link is one-half.

18. A method for routing a packet ultimately intended for a destination made in an IP network by a receiving node, wherein all links between nodes have an assigned weight wherein the cost of a route is the sum of the weight of all links on that route, and wherein the shortest route path between the receiving node and the destination node is the route that has the lowest possible cost designated C, the method comprising:

determining whether the next link of the shortest route path from the receiving node to the destination node is congested, wherein a link is congested if it is determined that the link exceeds one-half of the capacity of the link; and if the next link of the shortest route path from the receiving node to the destination node is congested:

identifying at least one node adjacent to the receiving node with a shortest route path between the adjacent node and the destination node having a cost less than C;

determining if the link between the receiving node and each of the at least one identified adjacent nodes is congested;

determining which of the at least one identified adjacent node with a link between the identified adjacent node and the receiving node that is not congested has the lowest cost route to the destination node; and routing the packet to one of the at least one node if the link between the receiving node and the one of the at least one identified adjacent node is not congested, wherein routing the packet to one of the at least one identified adjacent node comprises routing the packet to the adjacent node determined to have the lowest C cost route to the destination node.

* * * * *